March 1, 1938.   H. W. MACKEY   2,109,924
QUARTER WINDOW VENTILATING CONSTRUCTION
Filed Nov. 25, 1935    2 Sheets-Sheet 1
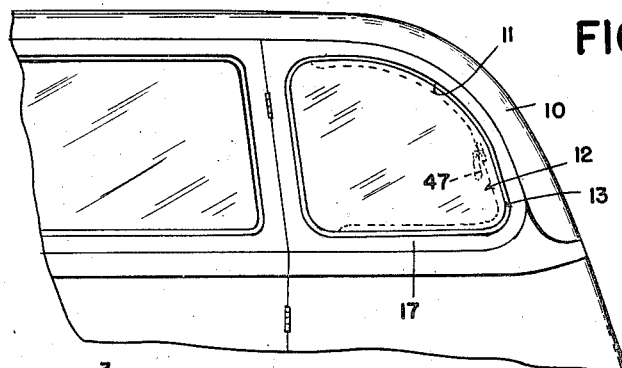
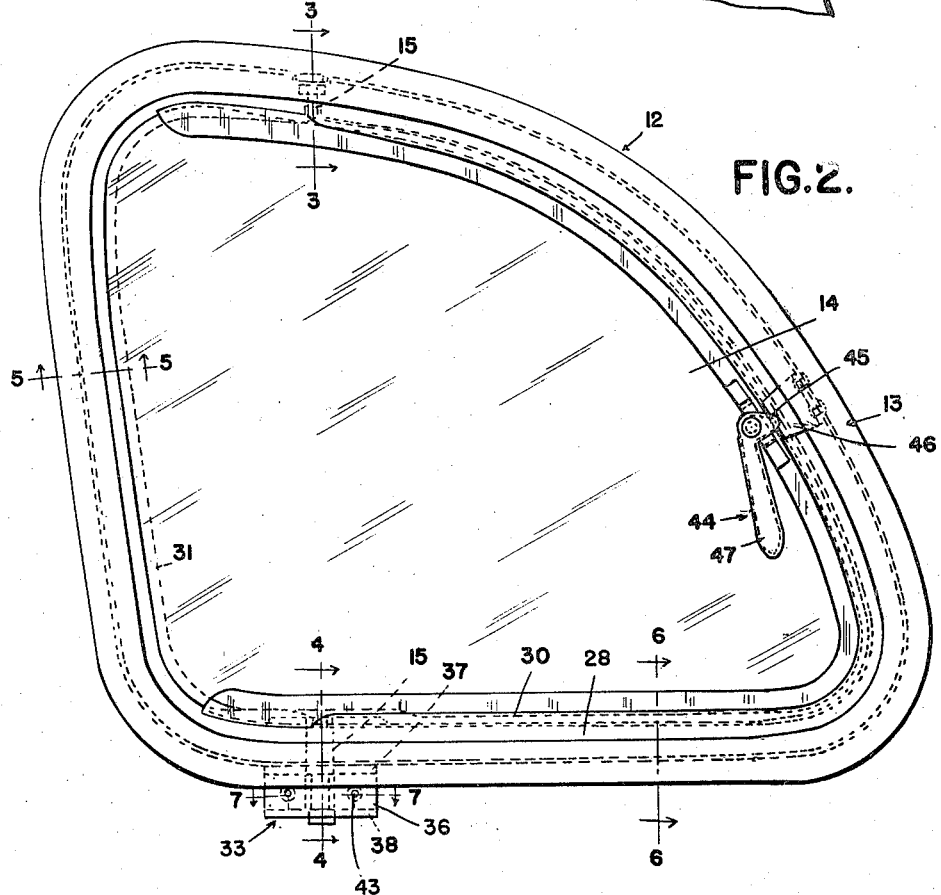
INVENTOR
HENRY W. MACKEY
BY *Whittemore Hulbert*
*Whittemore + Belknap*
ATTORNEYS March 1, 1938.  H. W. MACKEY  2,109,924
QUARTER WINDOW VENTILATING CONSTRUCTION
Filed Nov. 25, 1935  2 Sheets-Sheet 2
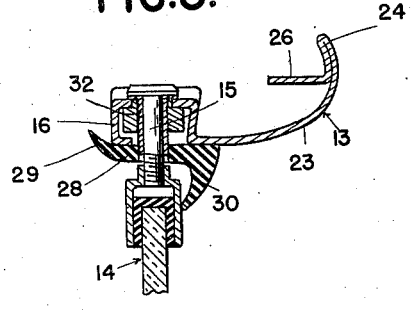
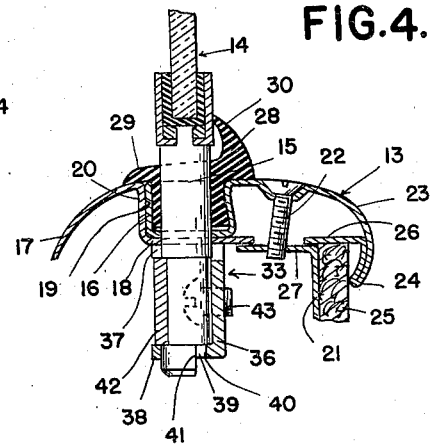
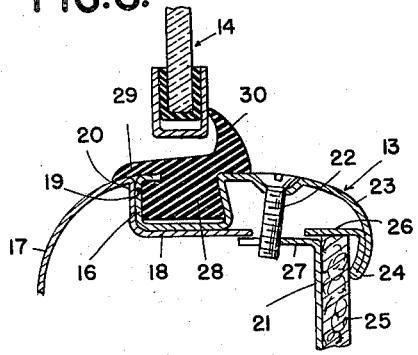
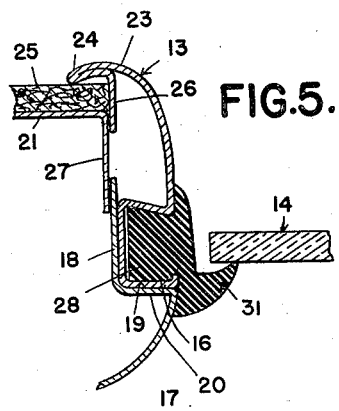
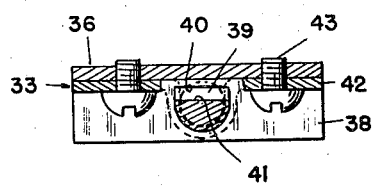
*INVENTOR*
HENRY W. MACKEY
BY Whittemore Hulbert
Whittemore & Belknap
*ATTORNEYS*

Patented Mar. 1, 1938

2,109,924

UNITED STATES PATENT OFFICE 2,109,924

QUARTER WINDOW VENTILATING CONSTRUCTION

Henry W. Mackey, Detroit, Mich., assignor to Motor Products Corporation, Detroit, Mich., a corporation of New York Application November 25, 1935, Serial No. 51,513

3 Claims. (Cl. 296—44)

This invention relates generally to vehicle bodies and refers more particularly to ventilating windows for vehicle bodies.

One of the principal objects of this invention is to provide a relatively simple ventilating window construction capable of being inexpensively manufactured and installed in the window opening of a vehicle body.

The present invention provides for reducing the cost of manufacture and simplifying the assembly of ventilating window constructions by pivotally mounting the ventilating window in the garnish molding frame for the window opening in such a manner as to permit assembling the ventilating window and frame as a unit in the window opening.

A further feature of this invention consists in providing a ventilating window carrying vertically arranged pivots secured within the garnish molding frame to provide for swinging movement of the window relative to the frame and having means thereon adjacent one swinging edge adapted to engage co-operating means on the garnish molding frame to secure the window to the frame in the plane of the window opening.

The foregoing, as well as other objects, will be made more apparent as this description proceeds, especially when considered in connection with the accompanying drawings, wherein Figure 1 is a fragmentary side elevational view of a vehicle body equipped with a ventilating window construction in accordance with this invention;

Figure 2 is an enlarged side elevational view of the ventilating window and garnish molding assembly;

Figure 3 is a sectional view taken substantially on the plane indicated by the line 3—3 of Figure 2;

Figure 4 is a sectional view taken substantially on the plane indicated by the line 4—4 of Figure 2;

Figure 5 is a sectional view taken substantially on the plane indicated by the line 5—5 of Figure 2;

Figure 6 is a sectional view taken substantially on the plane indicated by the line 6—6 of Figure 2; and Figure 7 is a sectional view taken substantially on the plane indicated by the line 7—7 of Figure 2.

For the purpose of illustrating my improved ventilating window assembly, I have shown the same as employed in the window opening through the rear quarter panel of a vehicle body, although it will be understood as this description proceeds that the invention may be advantageously used in numerous other installations.

Referring now more in detail to the drawings, it will be noted that there is illustrated in Figure 1, a portion of a vehicle body having a rear quarter panel 10 provided with a window opening 11 therethrough and having a ventilating window assembly 12 located within the window opening. The ventilating window assembly 12 comprises a garnish molding frame 13 and a swinging panel 14 pivotally supported within the molding frame 13 on vertically arranged pivots 15 carried by the garnish molding frame 13.

As shown in Figure 2, the garnish molding 13 corresponds in shape to the window opening 11 and is adapted to be inserted within the window opening to impart the desired finished appearance to the body. The cross sectional contour of the garnish molding frame is shown particularly in Figures 3 to 6 inclusive and, as will be observed from these latter figures, is provided with a continuous inwardly opening channel shaped portion 16 at the outer side thereof secured to the outer side panel 17 of the body. Upon reference to Figure 6, it will be noted that the portions 18 of the outer side panel 17 defining the opening 11 through the body are offset outwardly with respect to the window opening to form a recess 19 for receiving the continuous channel shaped portion 16 of the garnish molding from the inner side of the body. In detail, the transverse portions of the recess 18 form a seat for the base of the channel shaped portion 16 and the substantial vertical portions 20 form an abutment for the outer flanges of the base portion 16. The inner edges of the transverse portions of the recess 18 are secured to the inside body panel 21 and the garnish molding is removably secured to the panels by means of the fastener elements 22.

As will be observed from Figures 3 to 6 inclusive, the garnish molding is provided with a portion 23 extending inwardly from the inner flange of the channel shaped portion 16 and is returned bent at the inner edge to provide a lip 24 for engagement with the trim material 25 adjacent the marginal edges of the opening 11 through the body to secure this material in place upon the inner body panel 21. It will also be observed that the return bent portion of the garnish molding terminates in an outwardly extending transverse flange 26 adapted to be supported upon the transverse flange 27 extending outwardly from the inner body panel 21. With the above construction, it will be observed that the garnish molding 13 may be readily assembled within the window opening 11 from the inner side of the body and that this molding is positioned within the opening by the flange 20 forming the vertical side of the recess 18.

Secured within the channel shaped portion 16 of the garnish molding is a weatherstrip 28 surrounding the window 14 and having opposite side portions 29 extending laterally from the channel in overlapping engagement with adjacent portions of the outer body panel and garnish molding respectively. Upon reference to Figure 6, it will be noted that the portion 29 of the weatherstrip overlapping the outer panel 17 of the body conceals the joint between the vertical flange 20 and outer flange of the channel 16, so as to not only enhance the appearance of the assembly, but to also prevent the accumulation of moisture or other foreign matter between the aforesaid parts.

It has previously been stated that the window opening 14 is mounted in the garnish molding frame for swinging movement about the vertically arranged pivots 15 and the space between the marginal edges of the window and garnish molding is effectively sealed in the closed position of the window by the weatherstrip 28. In order to accomplish the above result without interfering with the desired swinging movement of the window, the weatherstrip 28 is molded to provide a lip 30 projecting into the window opening from the inner side of the weatherstrip and extending rearwardly from the bottom pivot 15 of the window to the co-operating top pivot 15 so as not to interfere with the movement of the portion of the window at the front side of the pivots inwardly. In addition, the weatherstrip 28 is provided with a second lip 31 projecting into the window opening from the outer side of the weatherstrip and extending forwardly from the lower pivot 15 of the window 14 to the co-operating top pivot 15 in such a manner as to co-operate with the lip 30 in effectively weatherproofing the window in its closed position, but at the same time, permit the rear section of the window to move outwardly with respect to the plane of the window opening. From the foregoing, it will be noted that although the lips are disposed upon opposite sides of the weatherstrip 28 in a manner to provide unrestricted swinging movement of the window, nevertheless, the lips are co-extensive and co-operate with one another to effectively seal the space between the garnish molding and window 14 in the closed position of the latter.

Upon reference to Figure 2 of the drawings, it will be noted that both of the pivots 15 are carried by the window 14 and are secured to the garnish molding 13. As shown particularly in Figure 3, the upper pivot 15 is journalled in a bushing 32 threadedly secured to the base of the channel shaped portion 16 of the garnish molding and extending into the weatherstrip 28. The lower pivot 15 extends through aligned openings in the weatherstrip 28 and base of the channel portion 16 of the garnish molding and is secured to the outer body panel 17 through the medium of a friction device 33. As shown in Figure 4, the friction device comprises a bracket 36 substantially channel shaped in cross section and secured to the horizontal portion 18 of the outer panel 17 with the channel opening laterally outwardly. The upper flange 37 of the channel is slotted to receive the lower end of the bottom pivot 15 and the lower flange 38 is formed with an opening 39 therethrough having a flat side 40 for engagement with the corresponding flat side 41 on the lower end of the bottom pivot 15 to limit the extent of swinging movement of the window 14. The friction on the bottom pivot 15 required to maintain the window 14 in any one of its adjusted positions is effected by means of a clamp 42 located within the channel and secured as at 43 at the base thereof. It will be observed from Figure 7 that the portion of the clamp between the fastener elements 43 extends around the bottom pivot 15 adjacent the flat side 41 and offers sufficient resistance to swinging movement of the window to actually hold the latter in its several adjusted positions.

The window 14 is held in its closed position in the plane of the window opening by means of a latch 44 carried by the window 14 at the rear side thereof and having a cam portion 45 adapted to co-operate with a bracket 46 on the garnish molding to secure the window 14 in intimate contacting relation with the lips 30 and 31. In detail, the cam 45 is pivotally supported upon the rear edge of the window 14 at the inner side thereof and is adapted to be actuated by a handle 47 located for convenient manipulation.

Thus, from the foregoing, it will be observed that I have provided a relatively simple and inexpensive ventilating window assembly capable of being expediently installed in the window opening of a vehicle body. It will also be observed that I have provided a construction wherein the ventilating window and varnish molding form a sub-assembly capable of being installed as a unit in the window opening.

What I claim as my invention is:

1. In a vehicle body having a window opening, a garnish molding frame completely surrounding the window opening and insertable as a unit into the said window opening from one side thereof, said frame comprising a continuous inwardly opening channel-shaped portion and a continuous generally laterally extending finishing portion, a closure panel for the window opening pivotally mounted in said frame for swinging movement out of the plane thereof, a weatherstrip secured within said channel-shaped portion and having portions cooperating with said panel in the closed position of the latter to form a seal around the edges of the panel, and means engaging the finishing portion of said frame for securing the assembled frame and panel to the body structure surrounding the window opening.

2. In a vehicle body having a window opening, a ventilating window assembly adapted for insertion as a unit in the window opening from one side of the opening, said assembly comprising an enclosing border frame for said opening having a continuous garnish molding portion and a continuous channel-shaped portion, a closure panel pivotally mounted in said frame for swinging movement transversely of the plane of said window opening, a weatherstrip secured in said channel-shaped portion and extending around the closure panel to form a seal in the closed position of said panel, and means engaging said garnish molding portion and the adjacent body structure to secure said ventilating window assembly in said window opening.

3. In a vehicle body having a window opening, a ventilating window assembly adapted for insertion as a unit in the window opening from one side of the opening, said assembly comprising an enclosing border frame for said opening having a continuous garnish molding portion extending generally laterally from the plane of the window opening and having an integral channel-shaped portion, a closure panel pivotally mounted in the channel-shaped portion for swinging movement transversely of the plane of said opening, a weatherstrip secured in the channel in co-extensive relation thereto and engageable with the adjacent edges of the panel in the closed position of the latter to form a seal, and means engaging said garnish molding portion and the adjacent body structure for securing said window assembly in said window opening.

HENRY W. MACKEY.